US012661750B2

(12) United States Patent
Namiki

(10) Patent No.: US 12,661,750 B2
(45) Date of Patent: Jun. 23, 2026

(54) MACHINE TOOL, POSITION INFORMATION CORRECTION METHOD, AND POSITION INFORMATION CORRECTION PROGRAM

(71) Applicants: CITIZEN WATCH CO., LTD., Tokyo (JP); CITIZEN MACHINERY CO., LTD., Nagano (JP)

(72) Inventor: Tatsuya Namiki, Nagano (JP)

( * ) Notice: Subject to any disclaimer, the term of this patent is extended or adjusted under 35 U.S.C. 154(b) by 600 days.

(21) Appl. No.: 18/245,873

(22) PCT Filed: Sep. 16, 2021

(86) PCT No.: PCT/JP2021/034181
§ 371 (c)(1),
(2) Date: Mar. 17, 2023

(87) PCT Pub. No.: WO2022/059748
PCT Pub. Date: Mar. 24, 2022

(65) Prior Publication Data
US 2023/0356344 A1     Nov. 9, 2023

Related U.S. Application Data

(60) Provisional application No. 63/080,784, filed on Sep. 20, 2020.

(51) Int. Cl.
*B23Q 15/013* (2006.01)
(52) U.S. Cl.
CPC ................................. *B23Q 15/013* (2013.01)
(58) Field of Classification Search
CPC ............................ B23Q 15/013; G05B 19/401
(Continued)

(56) References Cited

U.S. PATENT DOCUMENTS 4,382,215 A * 5/1983 Barlow .............. G05B 19/4015
                                                                          700/192
5,412,168 A * 5/1995 McKelvey ......... B23Q 11/0883
                                                                          200/61.41
(Continued)

FOREIGN PATENT DOCUMENTS

CN          102917821 A       2/2013
JP       H05-329702 A       12/1993
(Continued)

OTHER PUBLICATIONS

China National Intellectual Property Administration (CNIPA), Office Action for Chinese Patent Application No. 202180063921, Mar. 18, 2025.
(Continued)

*Primary Examiner* — Peter J Macchiarolo
*Assistant Examiner* — Anna Josephine Saunders
(74) *Attorney, Agent, or Firm* — Imaizumi IP Law, PLLC; Toshikatsu Imaizumi

(57) ABSTRACT

A machine tool has a spindle configured to rotatably grip a workpiece, a turret configured to mount a tool for processing the workpieces, a movable body configured to move independently from the spindle and the turret, a contact type sensor configured to move in accordance with a movement of the movable body, and a controller configured to calculate center position information indicating a center position of the spindle based on spindle position information acquired via the sensor moved to the vicinity of the workpiece by moving the movable body, wherein the controller acquires cutting edge position information indicating a position of a cutting edge of the tool via the sensor by moving the movable body, and corrects the cutting edge position information based on the center position information.

7 Claims, 5 Drawing Sheets

(58) Field of Classification Search
USPC .......................................................... 33/639
See application file for complete search history.

(56) References Cited

U.S. PATENT DOCUMENTS

| | | | | |
|---|---|---|---|---|
| 2008/0201005 A1* | 8/2008 | Hon | ..................... | G05B 19/401 |
| | | | | 700/109 |
| 2013/0014619 A1* | 1/2013 | Tsuyusaki | ................. | B23B 3/30 |
| | | | | 82/129 |
| 2023/0356344 A1* | 11/2023 | Namiki | ............... | B23Q 15/013 |

FOREIGN PATENT DOCUMENTS

| | | | |
|---|---|---|---|
| JP | H06-226593 | A | 8/1994 |
| JP | 2008-200798 | A | 7/2000 |
| JP | 2000-198047 | A | 9/2008 |
| JP | 2008-246642 | A | 10/2008 |
| WO | 01/94061 | A1 | 12/2001 |

OTHER PUBLICATIONS

WIPO, International Search Report for International Application No. PCT/JP2021/034181, Mar. 21, 2023.
WIPO, International Preliminary Report on Patentability including Written Opinion for International Application No. PCT/JP2021/034181, Mar. 21, 2023.
Korean Intellectual Property Office (KIPO), Office Action for Korean Patent Application No. 10-2023-7006732, Sep. 29, 2025 (Machine Translation Attached).

* cited by examiner

MACHINE TOOL, POSITION INFORMATION CORRECTION METHOD, AND POSITION INFORMATION CORRECTION PROGRAM

TECHNICAL FIELD

The present disclosure relates to a machine tool, a position information correction method and a position information correction program.

BACKGROUND

In machine tools including a turning center, machining center and etc., various techniques are known that detect positions of tools for processing workpieces. For example, it is known that a tool is manually contacted with a workpiece, a positional relationship between a cutting edge of the tool and the workpiece is measured, and the position of the tool is input to an NC device as offset. Further, a technique referred to as "external preset" is known that uses a measurement fixture referred to as a "presetter" in order to adjust a position of a tool, and attaches the tool to a tool holder which is attached to a machine tool. However, in these techniques, there have been various problems such that downtime of a machine tool and operator's load are increased.

To solve the above problems, it is known that a positional relationship between a workpiece and a tool in a machine tool is automatically measured. For example, it is described in Japanese Unexamined Patent Publication No. 2008-200798 that a machine tool defines a cutting edge position of a tool using a center coordinate of a workpiece measured by a probe as a reference position, based on a positional relationship between the peak of a stylus of a probe for measuring the center coordinate of the workpiece and the cutting edge of the tool. Further, it is described in Japanese Unexamined Patent Publication No. 2000-198047 that a machine tool calculates a cutting edge position of a tool with respect to a spindle center axis from a spindle center axis measured by contacting a detector of a sensor mounted on a turret with a workpiece, and a positional relationship between a tool attached to the turret together with the sensor and the sensor.

SUMMARY

However, in the techniques described in Japanese Unexamined Patent Publications No. 2008-200798 and No. 2000-198047, although center positions of workpieces are measured, positions of the cutting edges of the workpieces are not measured. Since the positions of the cutting edges of the tools are not measured in Japanese Unexamined Patent Publications No. 2008-200798 and No. 2000-198047, when a position of a cutting edge of a tool is displaced by heat generated from processing of workpieces etc., a positional relationship between the workpiece and the tool may include error caused by a displacement of the position of the cutting edge of the tool.

The object of a machine tool according to the present disclosure is to precisely measure a positional relationship between a workpiece and a tool.

A machine tool according to the present disclosure has a spindle configured to rotatably grip a workpiece, a turret configured to mount a tool for processing the workpieces, a movable body configured to move independently from the spindle and the turret, a contact type sensor configured to move in accordance with a movement of the movable body, and a controller configured to calculate center position information indicating a center position of the spindle based on spindle position information acquired via the sensor moved to the vicinity of the workpiece by moving the movable body, wherein the controller acquires cutting edge position information indicating a position of a cutting edge of the tool via the sensor by moving the movable body, and corrects the cutting edge position information based on the center position information.

Further, it is preferable for the machine tool according to the present disclosure that the controller acquires the cutting edge position information by moving the movable body so that the center position of the sensor is conformed to the center axis of the spindle, and contacting the cutting edge of the tool with the sensor by moving the turret.

Further, it is preferable for the machine tool according to the present disclosure that the sensor has a cylindrical support member, and a detector having a plurality of contacts arranged at the circumferential surface of the support member, and the step for moving the movable body so that the center position of the sensor is conformed to the center axis of the spindle includes a step for moving the movable body so that the center axis of the support member is conformed to the center axis of the spindle.

Further, it is preferable for the machine tool according to the present disclosure that the plurality of contacts includes four contacts arranged separated by 90 degrees each at the circumferential surface of the support member, and a distance between the pair of contacts arranged 180 degrees apart included in the four contacts is the same as the diameter of the workpiece.

Further, it is preferable for the machine tool according to the present disclosure that the movable body is a rear spindle arranged so as to face the spindle.

Further, a position information correction method for a machine tool having a spindle configured to rotatably grip a workpiece, a turret configured to mount a tool for processing the workpieces, a movable body configured to move independently from the spindle and the turret, a contact type sensor configured to move in accordance with a movement of the movable body, and a controller configured to calculate center position information indicating a center position of the spindle based on spindle position information acquired via the sensor moved to the vicinity of the workpiece by moving the movable body, executed by the controller and including acquiring cutting edge position information indicating a position of a cutting edge of the tool via the sensor by moving the movable body, and correcting the cutting edge position information based on the center position information.

Further, a position information correction program for a machine tool having a spindle configured to rotatably grip a workpiece, a turret configured to mount a tool for processing the workpieces, a movable body configured to move independently from the spindle and the turret, a contact type sensor configured to move in accordance with a movement of the movable body, and a controller configured to calculate center position information indicating a center position of the spindle based on spindle position information acquired via the sensor moved to the vicinity of the workpiece by moving the movable body, for causing the controller to execute a process including acquiring cutting edge position information indicating a position of a cutting edge of the tool via the sensor by moving the movable body, and correcting the cutting edge position information based on the center position information.

A machine tool according to the present disclosure may precisely measure the positional relationship between a workpiece and a tool.

DESCRIPTION OF EMBODIMENTS

Below, while referring to drawings, a machine tool, a control method of a machine tool and a control program of a machine tool will be explained. However, it should be understood that the present invention is not limited to the embodiments explained below.

Figure 1:
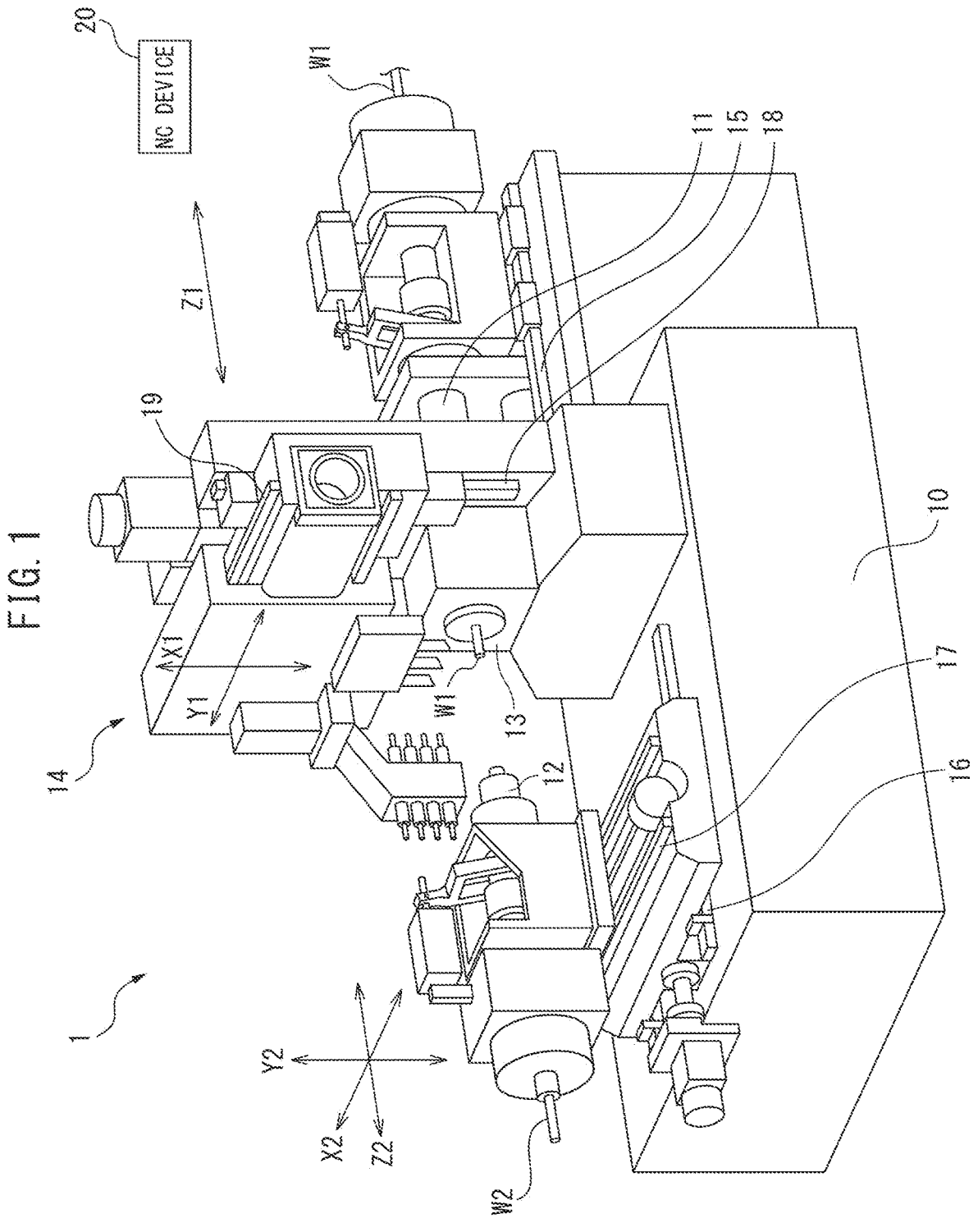
FIG. 1 is a perspective view of a machine tool according to an embodiment.

FIG. 1 is a perspective view of a machine tool according to an embodiment.

A machine tool 1 has a bed 10, a front spindle 11, a rear spindle 12, a guide bush device 13, a turret 14 and an NC device 20. The bed 10 mounts the front spindle 11, rear spindle 12, guide bush device 13 and turret 14. The front spindle 11 is a hollow member holding a cylindrical workpiece W1 and may move in a Z1 direction by mounted on a movement mechanism moving along a rail 15. The rear spindle 12 is a hollow member holding a cylindrical workpiece W2 and may move in Z2 and X2 directions by mounted on a movement mechanism moving along rails 16 and 17. The guide bush device 13 is fixed on the bed 10 and supports the workpiece W1 gripped by the front spindle 11 so as to guide the workpiece W1 slidably in the Z1 direction. The turret 14 is a member for holding a plurality of tools for processing the workpieces W1 and W2 gripped by the front and rear spindles 11 and 12, and may move in the X1 and Y1 directions by mounted on movement mechanisms moving long rails 18 and 19. The rotation, movement and etc. of the front and rear spindles 11 and 12 and turret 14 are controlled by the NC device 20 mounted on the machine tool 1. The front and rear spindles 11 and 12 and turret 14 may move independently of each other, in other words, separately move. The NC device 20 is a control device which has a processing circuit, a storage circuit for storing a position correction program for running position information correction processing, and etc., and instructs various operations of the machine tool. The position correction program may be installed in a management storage part 42 from for example a CD-ROM, DVD-ROM, or other computer readable portable recording medium using a known setup program.

Figure 2:
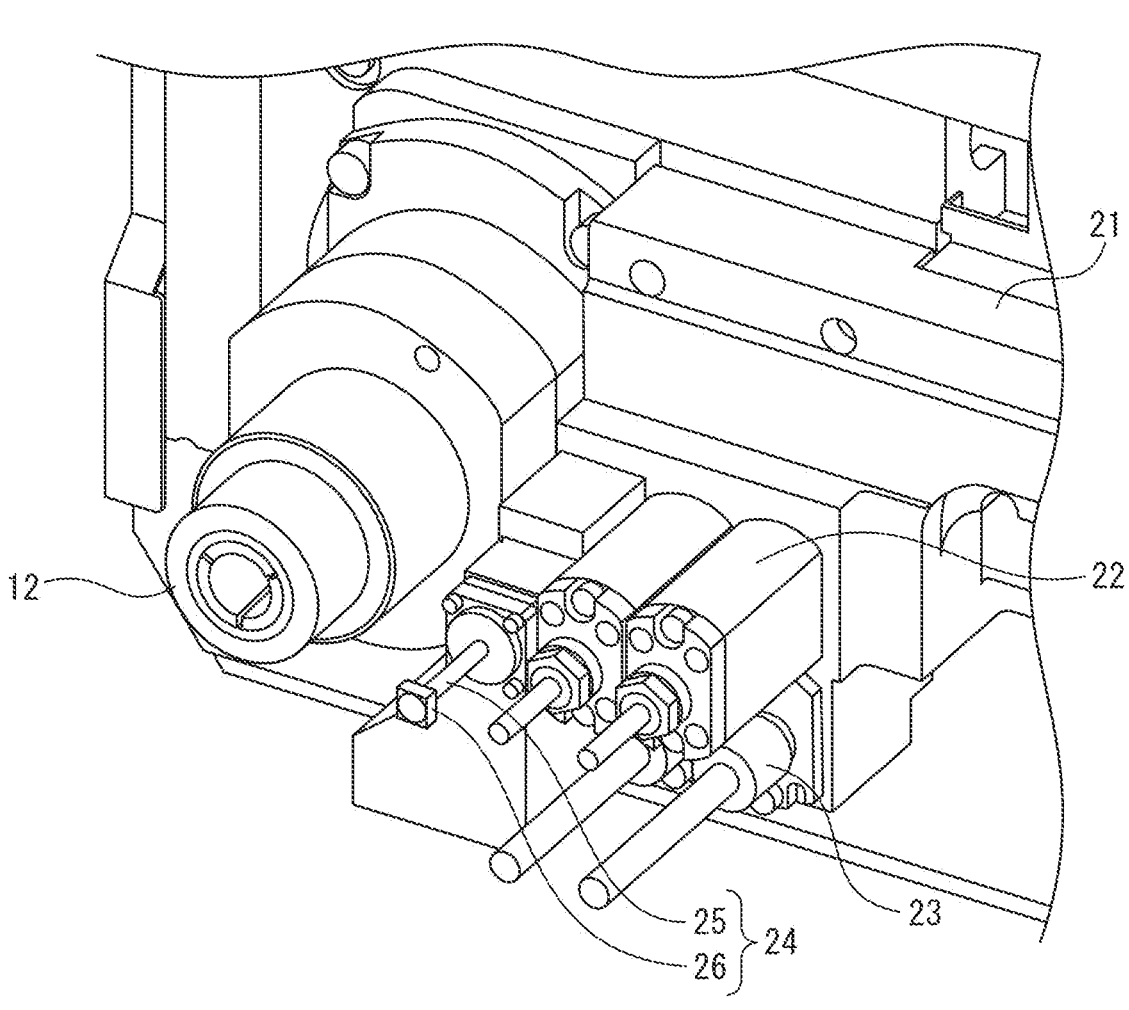
FIG. 2 is a perspective view of the rear spindle and a front turret arranged adjoining the rear spindle shown in FIG. 1.

FIG. 2 is a perspective view of the rear spindle 12 and a front turret 21 arranged adjoining the rear spindle 12.

The front turret 21 is also referred to as "a facing turret" and is a member holding drills and other rotary tools 22, non-rotary tools 23 and a tool setter 24 and integrally moves along with movement of the rear spindle 12. The tool setter 24 is a contact type position sensor having a cylindrical support member 25 and a detector 26 disposed at a circumferential surface of a front end of the support member 25. The detector 26 has four contacts arranged separated by 90 degrees each at the circumferential surface of the support member 25, and detects the position of the member from four directions including two directions for each of the X2 and Y2 directions, by contacting the four contacts with the workpiece W1 and etc.

The tool setter 24 may have four contacts which are contacted the workpiece W1 regardless of whether a distance between a pair of contacts arranged separated by 180 degrees among the four contacts on the detector 26 is smaller or longer than a diameter of the processed workpiece W1. Further, when a distance between a selected pair of contacts is the same as the diameter of the workpiece W1, the workpiece W1 is close to a process point, and therefore it is preferable that the distance therebetween is the same as the diameter of the workpiece W1. When the distance between the pair of contacts is equal to 0.8 time or 0.8 times more than and equal to 1.2 times or 1.2 times less than the diameter of the workpiece W1, it is deemed that the distance therebetween is the same as the diameter thereof.

Figure 3:
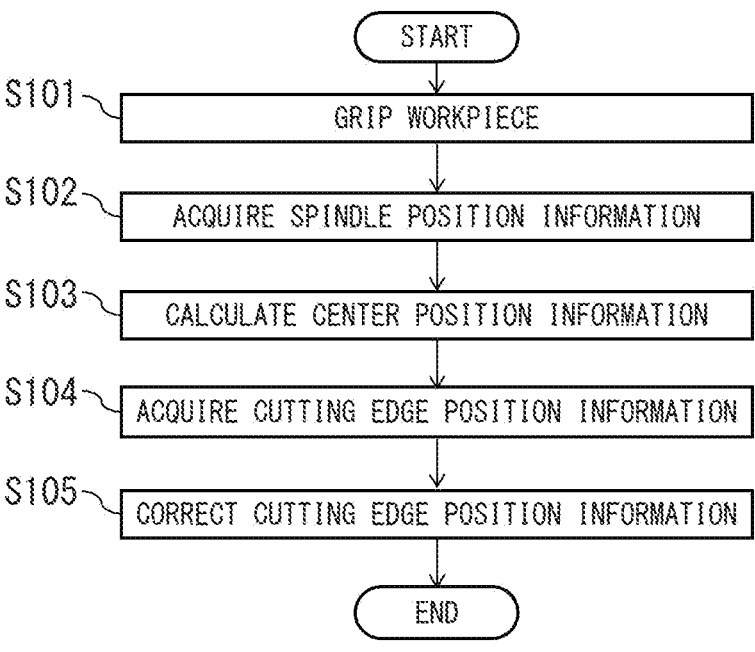
FIG. 3 is a flow chart of a position information correction processing performed by the machine tool shown in FIG. 1.

FIG. 3 is a flow chart of a position information correction processing performed by the machine tool 1. The position information correction processing shown in FIG. 3 is performed by controlling members in the machine tool 1 by instructions from the NC device 20, and coordinated with the members. Further, the position information correction processing shown in FIG. 3 may be performed before the workpiece W1 is processed by tools, and may be suitably performed while the workpiece W1 is processed by the tools. For example, the position information correction processing shown in FIG. 3 may be performed right after the machine tool 1 is started up, may be performed before the processing of the workpiece W1 is started, and may be performed each time a predetermined number of processed workpieces have been formed from the workpiece W1.

First, the NC device 20 instructs the front spindle 11 to grip the workpiece W1 (S101). The front spindle 11 grips the workpiece W1 by a (not shown) chuck in accordance with the instructions from the NC device 20.

Next, the NC device 20 instructs acquisition of spindle position information indicating a position of the front spindle (S102).

Figure 4B:
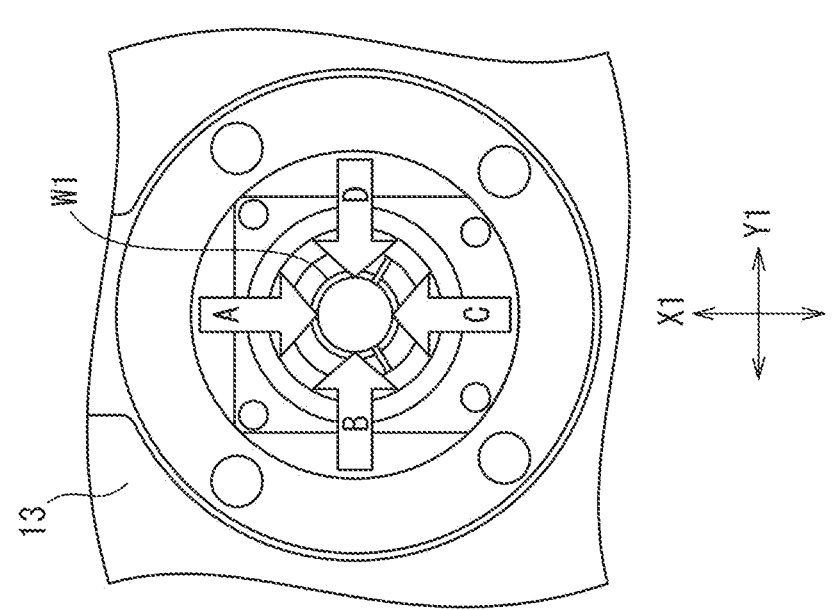
FIG. 4B is a view for explaining the processing of S102, and a front view of the guide bush device.
Figure 4A:
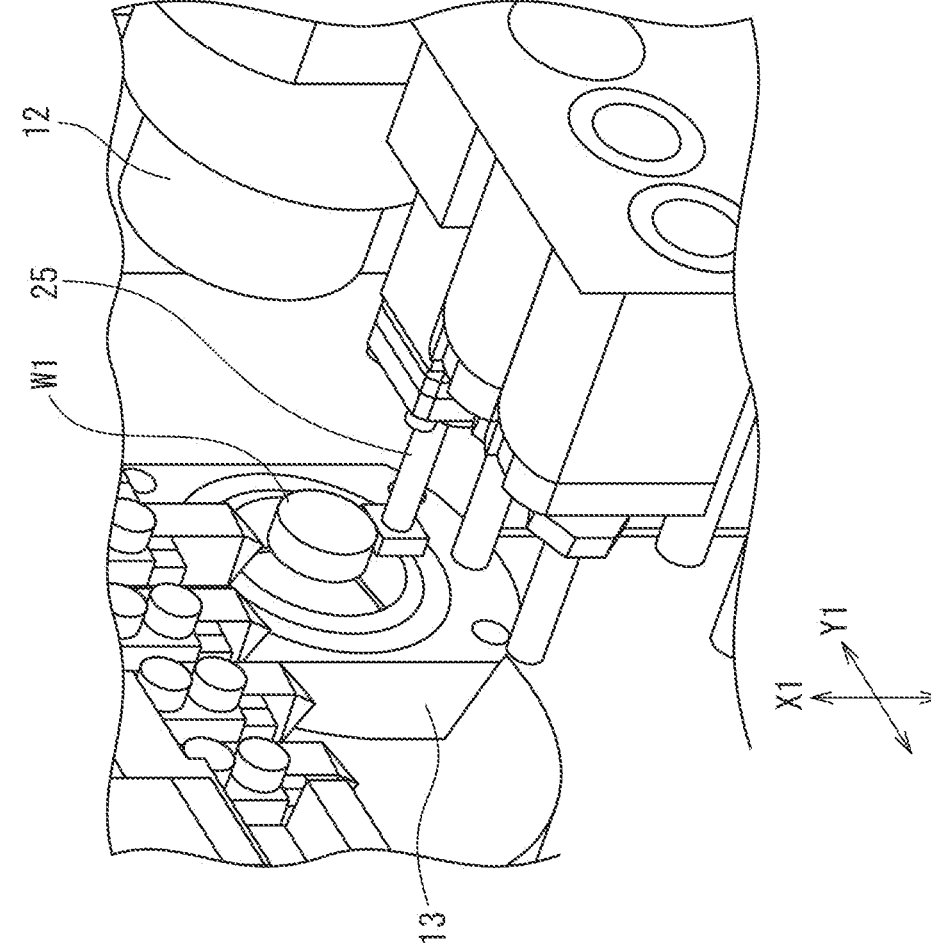
FIG. 4A is a view for explaining the processing of S102, and a perspective view of the rear spindle and guide bush device.

FIGS. 4A and 4B are views for explaining the processing of S102. FIG. 4A is a perspective view of the rear spindle 12 and guide bush device 13, and FIG. 4B is a front view of the guide bush device 13.

The NC device 20 moves the tool setter 24 to an area near the workpiece W1 supported by the guide bush device 13, by moving the rear spindle 12. The NC device 20 acquires spindle position information through the tool setter 24 which is moved to the area near the workpiece W1.

First, the NC device 20 contacts the detector 26 of the tool setter 24 with the workpiece W1 as shown in FIG. 4B by an arrow A, and acquires first position information P1 indicating a position of a top end of the workpiece W1 from the tool setter 24. Next, the NC device 20 contacts the detector 26 of the tool setter 24 with the workpiece W1 as shown in FIG. 4B by an arrow B, and acquires second position information P2 indicating a position of a left end of the workpiece W1 from the tool setter 24. Next, the NC device 20 contacts the detector 26 of the tool setter 24 with the workpiece W1 as shown in FIG. 4B by an arrow C, and acquires third position information P3 indicating a position of a bottom end of the workpiece W1 from the tool setter 24. Next, the NC device 20 contacts the detector 26 of the tool setter 24 with the workpiece W1 as shown in FIG. 4B by an arrow D, and acquires fourth position information P4 indicating a position of a right end of the workpiece W1 from the tool setter 24. Then, the NC device 20 stores the first position information P1 to the fourth position information P4 acquired through the tool setter 24 as spindle position information.

Next, NC device 20 calculates center position information indicating a center position of the front spindle 11 based on the spindle position information acquired by the processing of S102 through the tool setter 24 which moves to the area near the workpiece W1 by moving the rear spindle 12.

The NC device 20 calculates a coordinate Px of the center position of the front spindle 11 in the X1 direction as a center value (P1+P3)/2 of the first position information P1 indicating one coordinate of the workpiece W1 in the X1 direction and the third position information P3 indicating another coordinate of the workpiece W1 in the X1 direction. Further, the NC device calculates the coordinate Py of the center position of the front spindle 11 in the Y1 direction as a center value (P2+P4)/2 of the second position information P2 indicating one coordinate of the workpiece W1 in the Y1 direction and the fourth position information P4 indicating another coordinate of the workpiece W1 in the Y1 direction.

Next, the NC device 20 instructs the acquisition of cutting edge position information indicating a position of a cutting edge of a tool (S104).

Figures 5A, 5B:
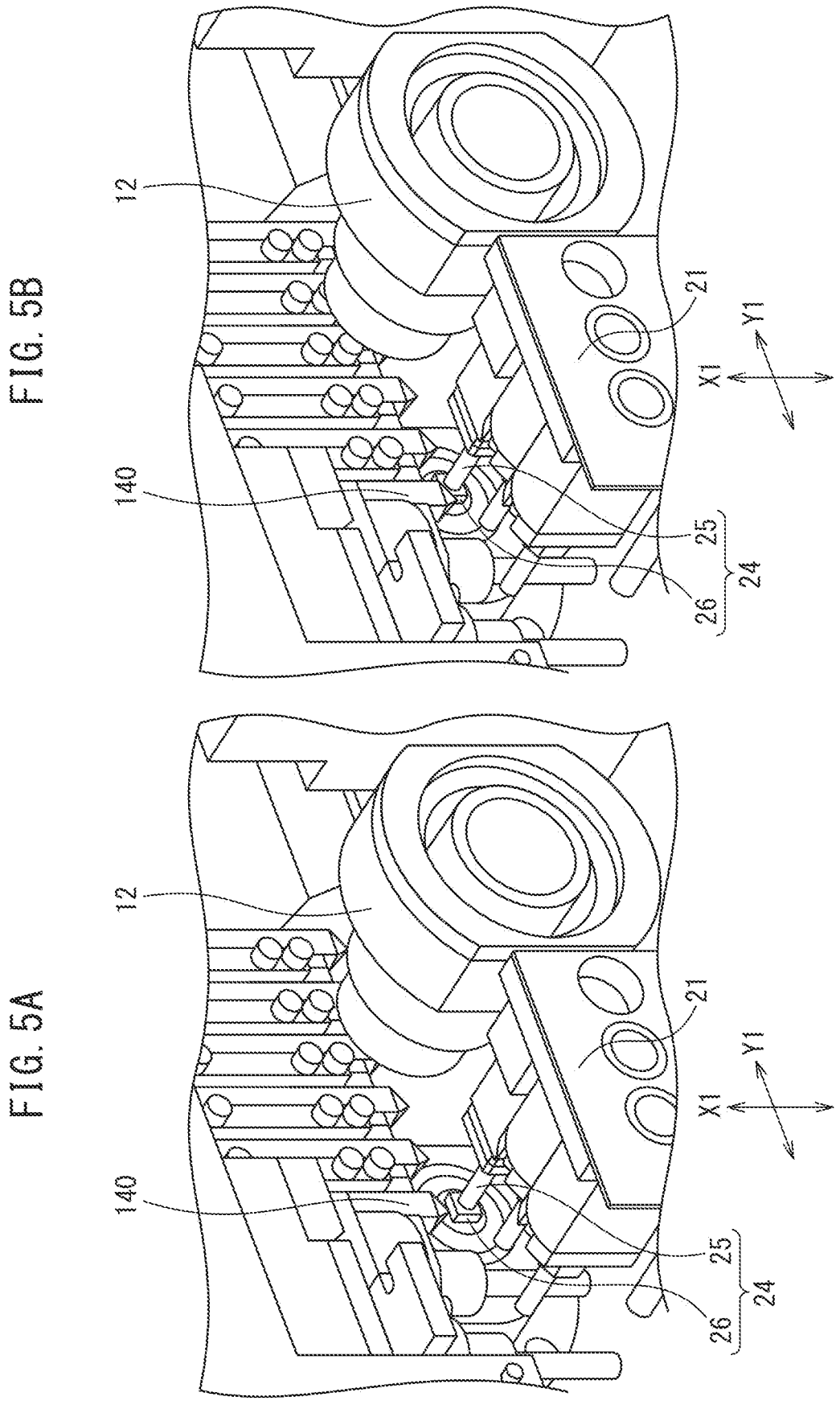
FIG. 5A is a view for explaining the processing of S104, and a perspective view of the rear spindle and guide bush device (part 1)
FIG. 5B is a view for explaining the processing of S104, and a perspective view of the rear spindle and guide bush device (part 2).

FIGS. 5A and 5B are views for explaining the processing of S104, FIG. 5A is a perspective view of the rear spindle 12 and guide bush device 13 (part 1) and FIG. 5B is a perspective view of the rear spindle 12 and guide bush device 13 (part 2).

The NC device 20 acquires the cutting edge position information by moving the rear spindle 12 so that the center position of the tool setter 24 is conformed to the center axis of the front spindle 11, and moves the turret 14 so that the cutting edge of the tool 140 held by the turret 14 is contacted with the tool setter 24.

First, the NC device 20 moves the rear spindle 12 as shown in FIG. 5A, so that the center axis of the support member 25 of the tool setter 24 is conformed to the center axis of the front spindle 11, and the detector 26 of the tool setter 24 comes close to the workpiece W1. The NC device 20 moves the rear spindle 12 so that the center of the support member 25 of the tool setter 24 in the X1 direction and Y direction is conformed to the coordinates (Px,Py) indicated by the center position information calculated at the processing of S103. Next, the NC device 20 acquires first cutting edge position information K1 indicating a position of a bottom end of the cutting edge from the tool setter 24 by contacting the cutting edge of the tool 140 with the tool setter 24 from one side of the turret 14 in the X1 direction, as shown in FIG. 5A. Next, the NC device 20 acquires second cutting edge position information K2 indicating a position of a right end of the cutting edge from the tool setter 24, by contacting the cutting edge of the tool 140 with the tool setter 24 from one side of the turret 14 in the Y1 direction, as shown in FIG. 5B, the NC device 20 calculates the coordinates (Kx, Ky) of the cutting edge of the tool 140 in the X1 and Y1 directions, by using the first cutting edge position information K1 and the second cutting edge position information K2.

Then, the NC device 20 corrects the cutting edge position information acquired by the processing of S104 based on the center position information calculated at the processing of S103 (S105). The NC device 20 corrects the coordinates (Kx,Ky) of the cutting edge of the tool 140 in the X1 and Y1 directions by using the coordinates (Px,Py) of the center position of the front spindle 11 in the X1 and Y1 directions included in the center position information as a reference, and generates the corrected coordinates (Cx,Cy). In the corrected coordinates (Cx,Cy), Cx is indicated by (Px-Kx), and Cy is indicated by (Py-Ky). The corrected coordinates (Cx,Cy) generated at the processing of S105 indicate the distance between the cutting edge position of the tool 140 and the workpiece W1, and the corrected coordinate Cx, is also referred to as the "diameter", and the corrected coordinate Cy is also referred to as the "core".

Then, the position information correction processing is completed. After the position information correction processing is completed, the machine tool 1 performs processing of the workpiece W1 by the tool 140 at the tool cutting edge positions corrected based on the position information correction processing.

Since the machine tool 1 measures the positions of both the workpiece W1 and tool 140 by the single tool setter 24, the machine tool 1 may correct the positional relationship between the workpiece W1 and tool 140 with a high precision.

Further, the machine tool 1 may conform the center position of the tool setter 24 to the center axis of the front spindle 11, by conforming the center position of the tool setter 24 to the center axis of the workpiece W1, and the tool setter 24 may come close to the vicinity of the workpiece W1 (processing position).

Further, the machine tool 1 acquires cutting edge position information indicating a position of the cutting edge of the tool 140 near a position for processing the workpiece W1 in the state where the tool setter 24 is arranged near the workpiece W1, and therefore the machine tool 1 may acquire cutting edge position information with a higher precision than when acquiring cutting edge position information in the state where the tool 140 is far from the workpiece W1.

Further, the machine tool 1 may calculate center position information indicating a center position of the front spindle 11, then, if a correction amount for a cutting edge position information based on the center position information has been stored in advance, the machine tool 1 uses the correction amount in order to correct the positional relationship between the workpiece W1 and the tool 140. In this case, the machine tool 1 may conform the center axis of the workpiece W1 to the center axis of the tool setter 24.

Further, since the machine tool 1 performs the position information correction processing while the workpiece W1 is processed by the tool 140, the machine tool 1 may correct the positional relationship between the cutting edge of the tool 140 and the workpiece w1 with a high precision even when the cutting edge of the tool 140 is worn. Further, since the machine tool 1 performs the position information correction processing while the workpiece W1 is processed by the tool 140, the machine tool 1 may detect breakage of the cutting edge of the tool 140.

Further, if the tool setter 24 is set so that the distance between the pair of contacts arranged 180 degrees apart included in the detector 26 is the same as the diameter of the workpiece W1, the cutting edge position information is acquired at a position closer to the position of the tool 140 when the workpiece W1 is processed. Since the distance between the pair of contacts arranged 180 degrees apart included in the detector 26 is the same as the diameter of the workpiece W1, the precision of the cutting edge position information may be further raised.

Further, since the tool setter 24 is attached to the front turret 21 which moves along with movement of the rear spindle 12, spindle position information and cutting edge position information are acquired from the workpiece W1 and tool 140 without separately providing members for movement of the tool setter 24.

In the machine tool 1, although the tool setter 24 is attached to the front turret 21 which moves along with movement of the rear spindle 12, in a machine tool according to the embodiment, the contact type sensor may be held by a movable body which moves the contact type sensor.

Further, in the machine tool 1, although the detector 26 of the tool setter 24 has contacts arranged so as to detect the X1 and Y1 directions, in a machine tool according to the embodiment, the detector of the tool setter may also have contacts so as to further detect the Z1 direction. When the detector of the tool setter may further detect the Z1 direction, the distance between the cutting edge position of the tool 140 and the workpiece W1 may be generated as three-dimensional coordinates including "length" showing the Z1 direction in addition to "diameter" showing the X1 direction and "core" showing the Y1 direction.

Further, in a machine tool according to the embodiment, the detector of the tool setter may also have contacts arranged so as to detect either of the X1 direction and Y1 direction. For example, when the detector of the tool setter may detect only the Y1 direction, the position information correction processing performs the position information correction processing for only the Y1 direction. The detector of the tool setter may also have only a single contact. When the detector of the tool setter has only a single contact, the tool setter is arranged so as to circle around the Z1 direction.

Further, in the explained position information correction processing, a guide bush device 13 is arranged so as to guide the workpiece W1 by supporting the workpiece W1, the machine tool according to the embodiment need not have the guide bush device 13.

What is claimed is:

1. A machine tool comprising:
a spindle configured to rotatably grip a workpiece;
a turret configured to mount a tool for processing the workpieces;
a movable body configured to move independently from the spindle and the turret;
a contact type sensor configured to move in accordance with a movement of the movable body; and
a controller configured to calculate center position information indicating a center position of the spindle based on spindle position information acquired via the sensor moved to the vicinity of the workpiece by moving the movable body, wherein
the sensor has a cylindrical support member and a detector, and the detector having a plurality of contacts includes four contacts arranged separated by 90 degrees each at a circumferential surface of the support member,
the controller acquires first position information indicating an upper end position of the workpiece, second position information indicating a left end position of the workpiece, third position information indicating a lower end position of the workpiece, and fourth position information indicating a right end position of the workpiece, as the spindle position information by moving the movable body to bring the detector into contact with the workpiece, and

the controller acquires cutting edge position information indicating a position of a cutting edge of the tool via the sensor by moving the movable body, and corrects the cutting edge position information based on the center position information.

2. The machine tool according to claim 1, wherein the controller acquires the cutting edge position information by moving the movable body so that the center position of the sensor is conformed to the center axis of the spindle, and contacting the cutting edge of the tool with the sensor by moving the turret.

3. The machine tool according to claim 2, wherein the step for moving the movable body so that the center position of the sensor is conformed to the center axis of the spindle includes a step for moving the movable body so that the center axis of the support member is conformed to the center axis of the spindle.

4. The machine tool according to claim 3, wherein a distance between the pair of contacts arranged 180 degrees apart included in the four contacts is the same as the diameter of the workpiece.

5. The machine tool according to claim 1, wherein the movable body is a rear spindle arranged so as to face the spindle.

6. A position information correction method for a machine tool having
a spindle configured to rotatably grip a workpiece;
a turret configured to mount a tool for processing the workpieces;
a movable body configured to move independently from the spindle and the turret;
a contact type sensor configured to move in accordance with a movement of the movable body; and
a controller configured to calculate center position information indicating a center position of the spindle based on spindle position information acquired via the sensor moved to the vicinity of the workpiece by moving the movable body,
wherein the sensor has a cylindrical support member and a detector, and the detector having a plurality of contacts includes four contacts arranged separated by 90 degrees each at a circumferential surface of the support member, executed by the controller:
acquiring first position information indicating an upper end position of the workpiece, second position information indicating a left end position of the workpiece, third position information indicating a lower end position of the workpiece, and fourth position information indicating a right end position of the workpiece, as the spindle position information by moving the movable body to bring the detector into contact with the workpiece, and
acquiring cutting edge position information indicating a position of a cutting edge of the tool via the sensor by moving the movable body; and
correcting the cutting edge position information based on the center position information.

7. A computer-readable recording medium having stored therein a position information correction program for a machine tool having
a spindle configured to rotatably grip a workpiece;
a turret configured to mount a tool for processing the workpieces;
a movable body configured to move independently from the spindle and the turret;
a contact type sensor configured to move in accordance with a movement of the movable body, wherein the sensor has a cylindrical support member and a detector, and the detector having a plurality of contacts includes four contacts arranged separated by 90 degrees each at a circumferential surface of the support member; and a controller configured to calculate center position information indicating a center position of the spindle based on spindle position information acquired via the sensor moved to the vicinity of the workpiece by moving the movable body, for causing the controller to execute a process comprising:

acquiring first position information indicating an upper end position of the workpiece, second position information indicating a left end position of the workpiece, third position information indicating a lower end position of the workpiece, and fourth position information indicating a right end position of the workpiece, as the spindle position information by moving the movable body to bring the detector into contact with the workpiece; and acquiring cutting edge position information indicating a position of a cutting edge of the tool via the sensor by moving the movable body; and correcting the cutting edge position information based on the center position information.

\* \* \* \* \*